United States Patent [19]
de Gennes

[11] 3,909,073
[45] Sept. 30, 1975

[54] MODULATION DEVICE APPLICABLE ESPECIALLY TO THE BRAKING CIRCUIT OF AN AUTOMOBILE VEHICLE

[75] Inventor: Gerard de Gennes, Senlis, France

[73] Assignee: Societe Anonyme Francaise du Ferodo, Paris, France

[22] Filed: May 17, 1974

[21] Appl. No.: 470,730

[30] Foreign Application Priority Data
May 24, 1973 France .............................. 73.18899

[52] U.S. Cl. ............... 303/21 F; 137/599.2; 303/68
[51] Int. Cl.² ...................... B60T 8/02; F15B 11/00
[58] Field of Search ....... 303/21 F, 6 C, 6 R, 61–63, 303/68–69, 21 AF; 188/181 A, 399; 137/599.2

[56] References Cited
UNITED STATES PATENTS

| | | | |
|---|---|---|---|
| 3,463,556 | 8/1969 | Kersting | 303/6 C X |
| 3,533,441 | 10/1970 | Tischler | 137/599.2 X |
| 3,724,914 | 4/1973 | Skoyles | 303/21 F |
| 3,782,786 | 1/1974 | Matsumura | 303/21 F |
| 3,792,908 | 2/1974 | Brewster et al. | 303/21 F |
| 3,801,161 | 4/1974 | Sharp | 303/21 F |

*Primary Examiner*—Trygve M. Blix
*Assistant Examiner*—Douglas C. Butler
*Attorney, Agent, or Firm*—Young & Thompson

[57] ABSTRACT

A fluid pressure-modulation device intended to be interposed between a hydraulic control and a corresponding receiver, comprising a first chamber connected to the control and a second chamber connected to the receiver, the chambers communicating with each other through a first passage controlled by a regulating valve and also through a second passage controlled by a normally-open isolating valve, the regulating valve being normally closed and the second passage controlled by the isolating valve being formed axially in the regulating valve.

The regulating and isolating valves are assembled together to form conjointly a valve unit which is movably mounted in the first chamber, the isolating valve being fitted into a bore formed in the regulating valve.

The device is especially applicable to the braking circuits of automobile vehicles in order to prevent locking of the vehicle wheels during braking.

13 Claims, 10 Drawing Figures

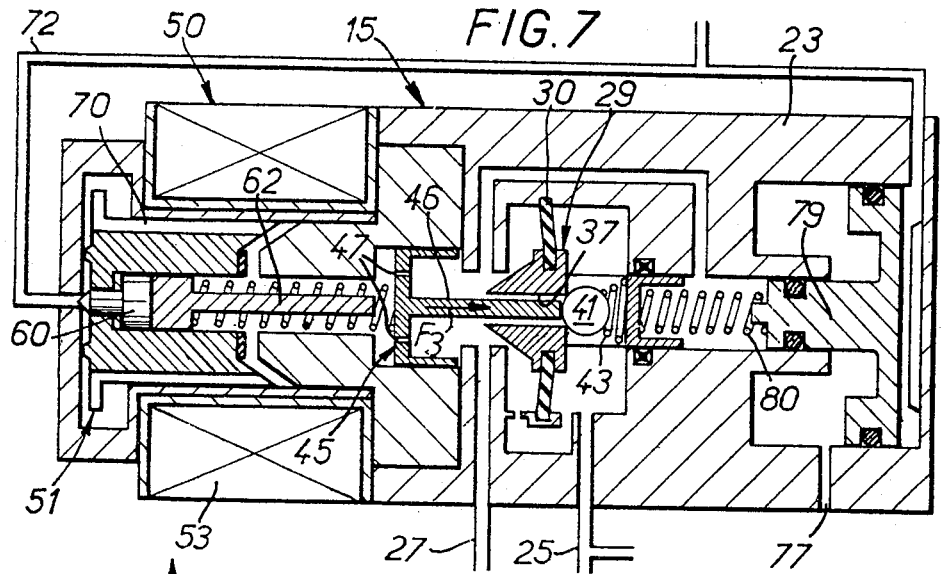
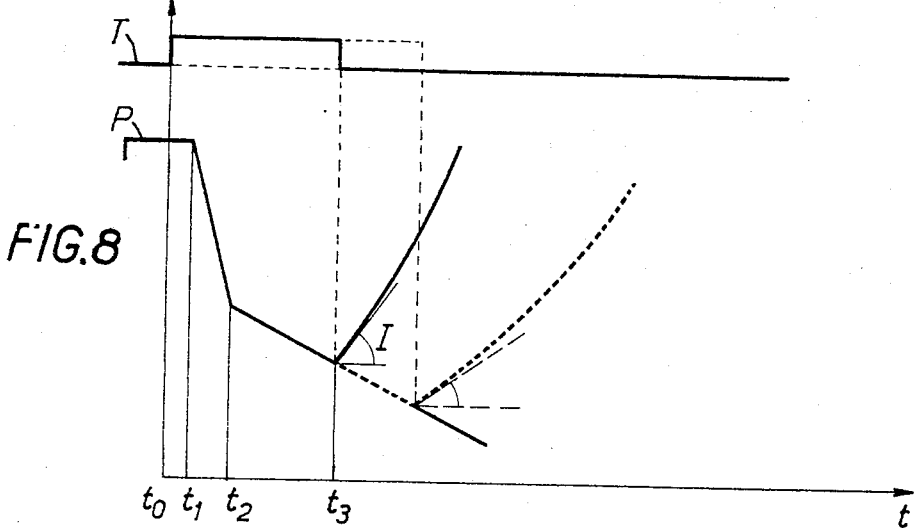
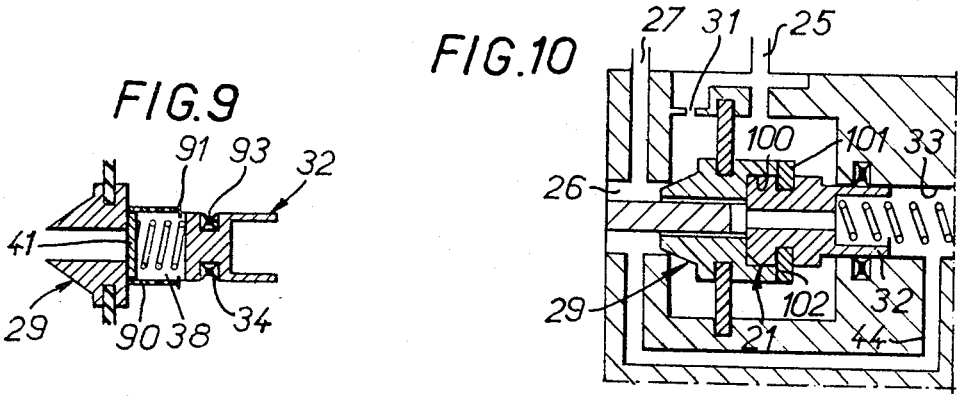

MODULATION DEVICE APPLICABLE ESPECIALLY TO THE BRAKING CIRCUIT OF AN AUTOMOBILE VEHICLE

The present invention relates generally to a modulation device intended to be interposed between a hydraulic control device and a receiver of any kind, and is more particularly concerned with the application of such a modulation device to the braking circuit of an automobile vehicle.

As is well known, the application of a toopowerful force on the brake pedal of an automobile vehicle may result in an undesirable locking of the wheel of this vehicle, during which the control of the vehicle becomes particularly difficult.

In order to prevent locking of the wheels of a vehicle, it has already been proposed to equip the braking circuit of this vehicle with a so-called "anti-locking" device comprising a modulation device interposed between on the one hand the master-cylinder or other hydraulic control of the braking circuit in question, and on the other hand the braking receiver associated with the wheels of the vehicle either for each of these wheels or for the wheels of a single axle, for one axle only or for both.

Such a modulation device is controlled by controlling means which are responsive to any one characteristic of the wheel or wheels to be supervised, speed for example, and control the use of the modulation device when, during braking, this characteristic reaches a critical value beyond which there appears a risk of locking of the wheel or wheels concerned.

In practice, when the critical conditions appear close to those corresponding to a locking of the wheel, the modulation device in question must cause the pressure to fall in the receiver of the wheel or wheels concerned, and this must occur whatever the braking force applied by the driver of the vehicle on the brake pedal, and then must allow this pressure to rise in a controlled manner when these critical conditions have disappeared, at the same time permitting an almost instantaneous return to the initial conditions as soon as the driver of the vehicle ceases to apply his action on the said brake pedal.

For this purpose there has been proposed a modulation device comprising especially a first chamber connected to the hydraulic control, in that case to the master cylinder of the vehicle, and a second chamber connected to the receiver concerned, in that case a braking receiver, the said chambers being capable of communicating with each other, on the one hand by a first passage controlled by a regulation valve which is normally open and on the other hand by a second passage controlled by an isolating valve which is normally open, a third valve with electro-magnetic control being provided in order to govern a communication between the second chamber and a third chamber which is elastically deformable.

Through the isolating valve, which is normally held open by a spring, there is normally a direct connection between the first and second chambers, and therefore between the master cylinder and the brake receiver.

When in consequence of an excessive force applied to the brake pedal, the pressure in the chamber connected to the brake receiver increases in a dangerous manner, and when the control means then come into action, the third valve puts the second and third chambers into communication, which permits a circulation of the fluid from the second chamber towards the third chamber and from the first chamber towards the second chamber, which results in the closure of the valve, the pressure falling in the brake receiver.

When the critical conditions capable of leading to a locking of the wheel have then disappeared, the control means cease to act, the third valve is permitted to close, which permits a gradual increase in pressure in the second chamber and therefore in the brake receiver. This gradual rise is obtained by the second valve which regulates the rate of flow of circulation of fluid from the first chamber towards the second chamber, proportionally to the pressure in the second chamber, and conversely proportionally to the pressure in the third chamber.

When the driver of the vehicle ceases to act on the brake pedal, the isolating valve returns to its open position, unless it has already so returned.

In a modulation device of this kind, the various functions referred to above: fall in pressure, rise in pressure regulated are effected by members which act independently of each other and this has the following disadvantages:

Continual operation of the regulation valve which on the one hand hinders the fall in pressure and on the other hand causes a loss of fluid, resulting in a "foot on the floor," that is to say to a collapse of the brake pedal under the vehicle driver's foot;

the response times are not as short as may be desirable.

In addition, in a modulation device of this type, the fall in pressure and especially the rise in pressure are a function of the pressures in the master cylinder and in the brake receiver, whereas it would be desirable for them to be independent.

The present invention has generally for its object an arrangement which enables these disadvantages to be overcome.

According to the invention, a modulation device intended to be interposed between any hydraulic control and any receiver, is of the kind comprising a first chamber connected to the said control and a second chamber connected to the said receiver, the said chambers being capable of communicating with each other, on the one hand through a first passage controlled by a regulation valve, and on the other hand through a second passage controlled by an isolating valve which is normally open, and is characterized in that the regulation valve is normally closed and in that the second passage is formed axially in the said regulation valve.

The regulation and isolating valves form conjointly a mobile valve unit in the first chamber and the isolating valve has a guiding tail slidably engaged in a fluid-tight manner in a bore coupled to the second chamber.

Finally, the isolating valve is normally held open by a finger controlled by a device, in practice an electromagnet responsive to an action of the associated control means.

The advantageous result of these arrangements is that the fall in pressure is abrupt and rapid, that the regulation valve being normally closed, there is no collapse of the brake pedal under the driver's foot, that the rise in pressure is effected without any undesirable response time, that there is little pressure loss, and that both the fall in pressure and the rise in pressure are independent of the pressures in the hydraulic control and in the receiver.

The characteristic features and advantages of the invention will furthermore be brought out in the description which follows below, given by way of example, reference being made to the accompanying diagrammatic drawings, in which:

FIGS. 3 to 7 are views similar to FIG. 2 for various successive phases of operation of this modulation device;

FIG. 8 is a diagram illustrating this operation;

FIGS. 9 and 10 are partial views similar to FIG. 2 and each is concerned respectively with an alternative form of construction.

FIG. 1 illustrates the application of the invention to a braking circuit of an automobile vehicle.

Figure 1:
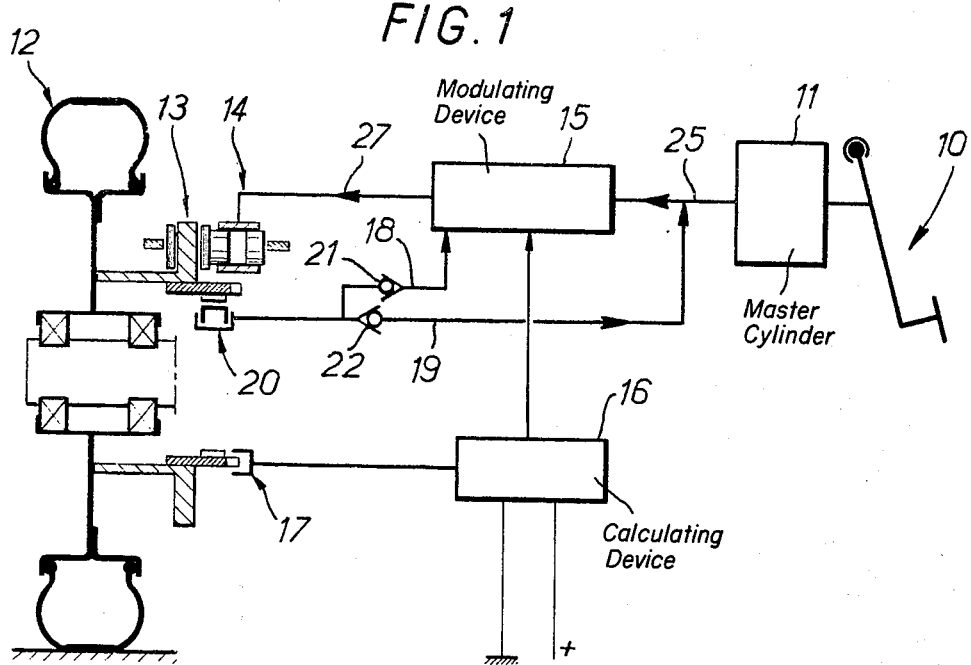
FIG. 1 is a block diagram of a braking circuit equipped with a modulation device according to the invention.

In this FIG. 1 there has been shown diagrammatically at 10 the brake pedal of this vehicle, at 11 the master cylinder which it controls, at 12 one of the wheels of the vehicle, at 13 a member to be braked, fast for rotation with this wheel, and at 14 the braking receiver associated with this member.

In known manner, a modulation device 15 is interposed between the master-cylinder 11 and the braking receiver 14, and this modulation device 15 is controlled by a calculating device 16, operated in turn by a speed detector 17 responsive to the angular speed of the wheel 12.

In practice, the modulation device 15 is connected to the master-cylinder 11 by a conduit 25 and to the braking receiver 14 by a conduit 27.

A circulation of fluid is ensured in the modulation device 15 by conduits 18, 19 which are connected to a pump 20 driven by the wheel 12, and which each comprise a non-return valve 21, 22 respectively. In the example shown, the conduit 19 is branched on the conduit 25.

The modulation device 15 comprises a body 23 made-up of various parts assembled together in an appropriate manner which it is unnecessary to refer to in detail.

In the centre of this body, a first chamber 24 is formed which is capable of being connected to the mastercylinder 11 through the conduit 25.

With this first chamber 24 is associated a second chamber 26 which is capable of being connected to the braking receiver 14 through the conduit 27.

These two chambers 24 and 26 are able to communicate with each other through a first passage 28 having a section S.

This passage 28 is controlled by a clapper-valve 29 hereinafter known as a regulation valve.

This regulation valve 29 is movably mounted in the chamber 24 and is fixed at its periphery to a flexible diaphragm 30 which in practice divides the chamber 24 into two spaces, namely a first space 24A which is in direct connection to the conduit 25, and a second space 24B which is connected to the previous space by a calibrated nozzle 31.

The regulation valve 29 is furthermore fixed to a guiding tail 32 which is slidably engaged in a fluid-tight manner in a bore 33 of the body 23.

This bore 33 is formed in the extension of the passage 28 and has the same section S as this passage.

The guiding tail 32 is surrounded by a sealing joint 34 which, in the example shown in FIGS. 2 to 7, is arranged in a groove 35 formed for that purpose in the body 23.

The chambers 24 and 26 are also able to communicate with each other through a second passage 37 formed axially in the regulation valve 29 and opening, behind this valve, into a recess 38 formed in the guiding tail 32, this recess 38 having a bottom wall 40 facing the second passage 37.

The recess 38 of the guiding tail 32 serves as a housing for a clapper-valve 41 adapted to close the second passage 37 and urged for that purpose towards this latter by a spring 43 which is supported on the bottom wall 40 of the said recess.

In the example shown in FIGS. 2 to 7, this second valve 41, known hereinafter as the isolation valve, is constituted by a simple ball.

The isolation valve 41 is actuated by a piston 45 which carries for that purpose a finger 46 engaged in the passage 37, the said piston being slidably mounted in a bore 42 of the body 23.

In practice, the chamber 26 is defined by the piston 45 and the regulation valve 29, and it communicates by a passage 44 with the bore 33 in which slides the guiding tail 32, to the rear of this latter.

The piston 45 is provided with calibrated passages 47.

The bore 42 in which it slides is extended by a bore 48 formed partly in the yoke 49 of an electro-magnetic control device 50 and partly in the armature 51 of this device, this armature 51 being movably mounted in the body 23 and forming with the associated yoke 49 an air-gap 52 which is conical in the example shown.

The electro-magnetic control device 50 further comprises an operating coil 53 which surrounds the yoke 49 and the armature 51.

The armature 51 is movably mounted against the action of a spring 55 which is supported on a shoulder 56 of the body 23 and urges it in the direction of the front corresponding wall 57 of the body.

In addition, this armature 51 is provided at its periphery with longitudinal grooves 58 so as to permit the passage of fluid.

The coil 53 of the electro-magnetic control device 50 is connected to the calculating device 16 shown above.

In the bore 48, and more precisely in the portion of this bore which is formed in the yoke 49, a piston 60 is movably mounted.

A spring 61 is provided between this piston 60 and the piston 45 previously described.

On that of its faces which is opposite the piston 45, the piston 60 carries a rod 62 against which the piston 45 can come into abutment.

On its opposite face, the piston 60 carries a needle-valve 63 which passes through the armature 51 and is intended to close a passage 64 formed in the front wall 57 of the body 23.

The bore 48 which extends the bore 42 in which slides the piston 45, forms in practice with the portion of the bore 42 which is in front of the piston 45, the longitudinal grooves 58 of the armature 51 and the recess in which this latter moves behind the front wall 57 of the body 23, an intermediate chamber 70.

Through the passage 64 formed in the front wall of the body 23, and through a conduit 72 coupled to this passage, the intermediate chamber 70 is capable of being connected to an accumulation chamber 73 formed at the other extremity of the body 23, between the corresponding front wall 74 of this body and a piston 75 movably mounted in a bore 76 which is connected to the atmosphere through a passage 77.

The front wall 74 of the body 23 carries a boss 78 for making contact with the piston 75.

On its face opposite to the boss 78, the piston 75 carries a tail 79 slidably engaged in a fluid-tight manner in the bore 33 in which there is already engaged the guiding tail 32 of the valve unit formed conjointly by the regulating valve 29 and the isolating valve 41.

A spring 80 is mounted between this guiding tail 32 and the tail 79 of the piston 75.

On the conduit 72 there is branched the conduit 18 which, comprising a non-return valve 21, couples the modulation device 15 to the pump 20. The associated conduit 19 which comprises the non-return valve 22 is established between this pump 20 and the conduit 25 connecting the modulating device 15 to the master-cylinder 11.

Figure 2:
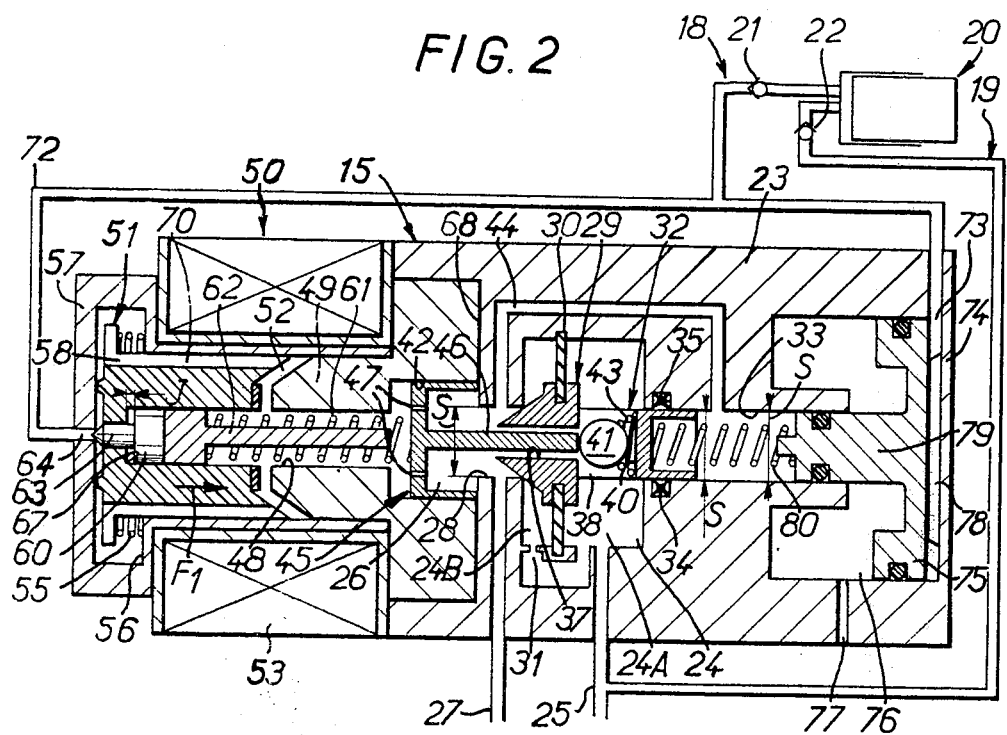
FIG. 2 is a diagrammatic view in axial section of this modulation device.

In the position of rest, as shown in FIG. 2, the armature 51 is supported against the front wall 57 of the body 23 under the action of its spring 55. Due to the urging action of the spring 61, the needle-valve 63 closes the passage 64 which it controls, and a clearance J exists between the piston 60 and a shoulder 67 of the armature 51.

Under the urging action of this same spring 61, the piston 45 is in contact against a shoulder 68 of the body 23. Under the action of the spring 80, the regulating valve 29 closes the passage 28; under the action of this same spring 80, the piston 75 is in contact with the boss 78 on the front wall 74 of the body 23, and owing to the finger 46 carried by the piston 45, the isolating valve 41 is in the open position.

For this reason, the same pressure exists in the chambers 24, 26 and 70 and in particular the two faces of the piston 45 are subjected to the same pressure.

If an action is applied on the brake-pedal 10, the equality of the pressure in the first chamber 24 and in the second chamber 26 continues normally, the isolating valve 41 being fully open.

Thus, the effect of the force applied on the brake pedal 10 is wholly applied to the braking receiver 14.

If the slowing-down which results for the wheel 12 becomes too accentuated, to the point at which this wheel is about to become locked, during the course of braking, before the stopping of the vehicle, the calculating device 16 effects the application of a determined voltage T to the coil 53 of the electro-magnetic control device 50, following a process which does not form part of the present invention and which will therefore not be described here.

Figure 3:
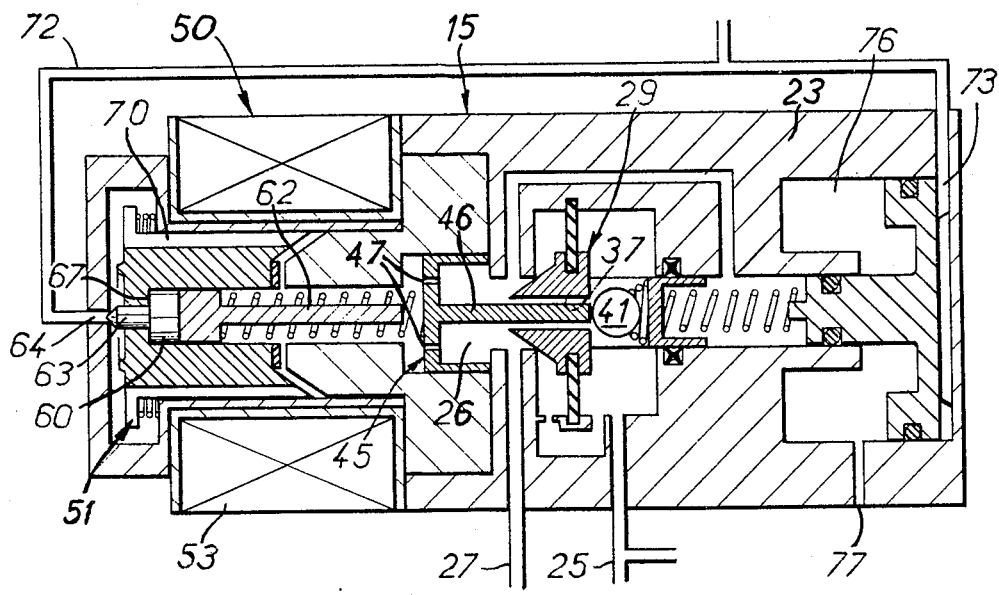
Figure 4:
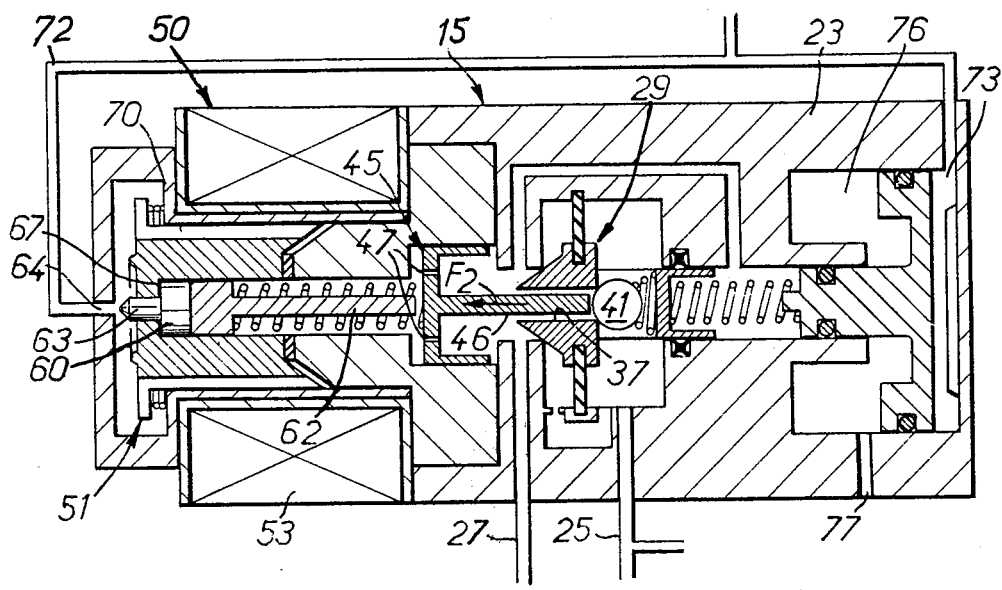

Due to this voltage T, the armature 51 moves in the direction of the arrow $F_1$ of FIG. 1, and after a dead travel corresponding to the absorption of the clearance J, its shoulder 67 comes into contact with the piston 60 (see FIG. 3), which causes the operation of this piston and therefore the liberation by the needle-valve 63 of the passage 64 causing the intermediate chamber 70 to communicate with the accumulation chamber 73 (see FIG. 4).

Due to the liberation of this passage 64 and to the high pressure existing until then in the chamber 26 and the intermediate chamber 70, there is a leakage of fluid from the intermediate chamber 70 towards the accumulation chamber 73 and therefore from the chamber 26 towards the intermediate chamber 70.

Due to this leakage of fluid and to the existence of the calibrated passages 47 of the piston 45 causing the chamber 26 to communicate with the intermediate chamber 70, the pressure in this latter chamber falls to a value lower than the pressure in the chamber 26.

The two faces of the piston 45 are then no longer subjected to the same pressure, and this piston moves in the opposite direction to the armature 51, following the arrow $F_2$ of FIG. 4.

In consequence, the finger 46 carried by this piston 45 loses contact with the isolating valve 41 and this latter is urged by its spring 43 so as to close the passage 37.

The regulating valve 29 being furthermore also in the closed position, the chamber 26 becomes isolated from then on from the chamber 24 and in consequence, the pressure in the chamber 24 can increase, under the effect of the action applied on the brake-pedal 10, without the pressure in the chamber 26 being thereby modified; the braking receiver 14 is isolated from the master-cylinder 11.

Very much to the contrary, due to the fact of the leakage of fluid referred to above, and due to the backward movement of the piston 45, the pressure in the chamber 26 falls abruptly, this backward movement, of the piston 45 being furthermore accentuated by the elastic return of the receiver 14 towards its normal condition of rest after the elastic deformation to which it has been subjected due to the excessive pressure which has been applied to it.

Figure 5:
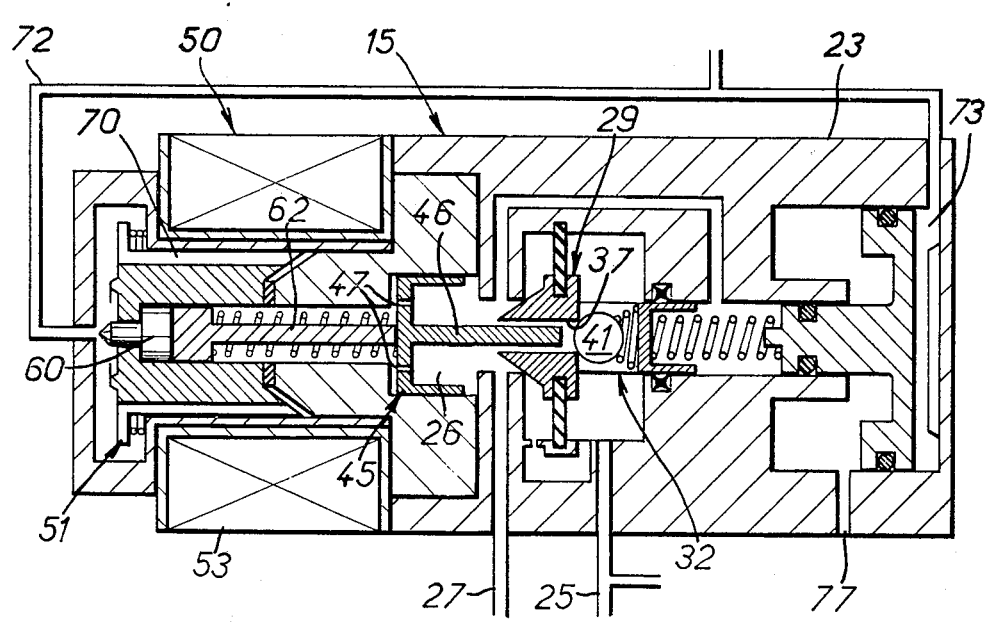
Figure 6:
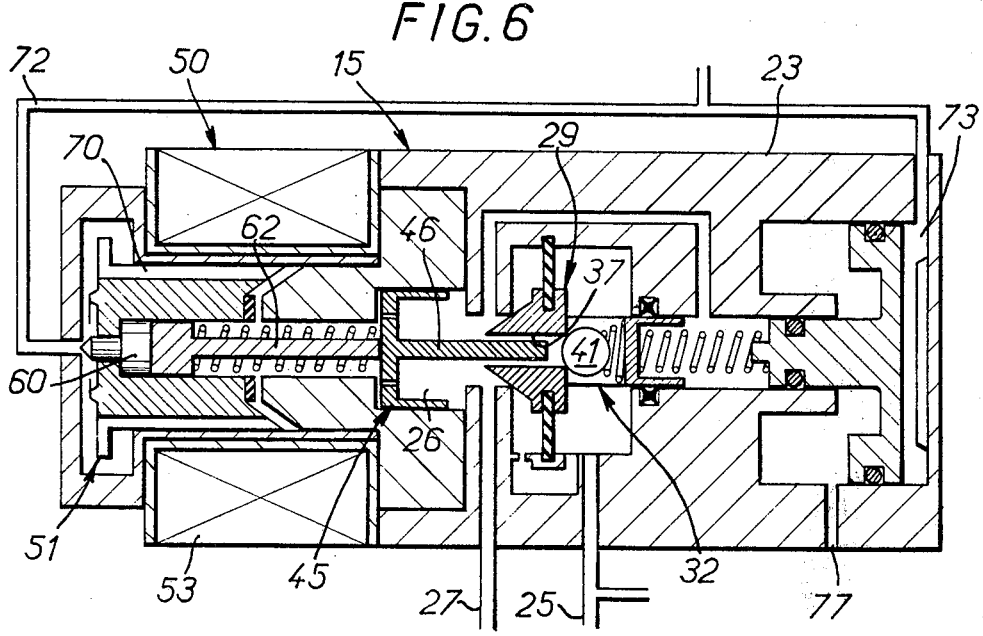

The abrupt fall in pressure in the chamber 26 continues until the piston 45 again comes into contact with the rod 62 carried by the piston 60 (see FIG. 5).

A new phase begins, during the course of which the armature 51, the piston 60, its rod 62 and the piston 45 form conjointly a mobile unit fixed together and subjected on the one hand and in a first direction, to the magnetic force developed by the coil 53 of the electro-magnetic control device 50 and on the other hand to the differential pressure applied to the piston 45.

The result is that, pushed back by the action of the piston 45, the needle-valve 63 slightly re-closes the passage 64 (see FIG. 6) which slows down the leakage of fluid through this passage and therefore slows down the fall of pressure in the chamber 26.

In this way there is established an equilibrium between the forces applied to the unit constituted by the armature 51, the piston 60, its rod 62 and the piston 45, as explained above, and to this equilibrium there will correspond a regulated fall in pressure in the chamber 26.

This phase of the operation continues until the voltage T is no longer applied to the coil 53 of the electro-magnetic control device 50 (see FIG. 7) under the action of the calculating device 16.

The armature 51 returns immediately to its initial position under the action of its spring 55 and by the urging action of the spring 61, and the needle-valve 63 which was close to the outlet of the passage 64, instantaneously closes this latter.

As the piston 45 is no longer subjected to differential pressures, the spring 61 pushes it back in the direction of the arrow $F_3$ of FIG. 7, and the finger 46 carried by the piston 45 again comes into contact with the isolating valve 41.

This valve 41 is however closed by the effect of its spring 43 and especially of the differences in pressure existing in the chambers 24 and 26, while the regulating valve 29 is only urged itself into the closed position by the single spring 80, the hydraulic forces acting on this regulating valve 29 in the chamber 24 being balanced due to the equality of the sections of passages 28 in which the valve 29 is engaged and the section of the bore 33 in which is engaged the guiding tail 32 carried by this valve.

By construction, the spring 80 is chosen to be stronger than the spring 43. The isolating valve 41 remains in the closed position and forms a mobile unit with the regulating valve 29. The finger 46 of the piston 45 thus pushes back the regulating valve 29 through the intermediary of the isolating valve 41.

The chamber 26 is from then on in communication with the chamber 24, or more precisely with the space 24B of this chamber, so that the pressure in the chamber 26 gradually rises under the control on the one hand of the calibrated nozzle 31 which causes the spaces 24A, 24B of the chamber 24 to communicate with each other, and on the other hand, of the spring 80 which has been more or less compressed, depending on the quantity of fluid previously transferred through the passage 64 and the conduit 72 from the intermediate chamber 70 to the accumulation chamber 73.

As previously for the needle-valve 63, the regulating valve 29 takes-up a position of equilibrium as a function of the only elastic forces to which it is subjected, due to the springs 61 and 80, as explained above, and the rise in pressure which results in the chamber 26 is advantageously independent of the pressure in the chamber 24, and is essentially a function of the quantity of fluid extracted in the brake.

This phase of operation continues until the isolating valve 41 is again actuated to opening by the finger 46 of the piston 45.

Such actuation to opening is instantaneous if the depression force applied on the brake pedal 10 is released.

These various phases of operation are shown in the diagram of FIG. 8, which represents in abscissae the time t and in ordinates, on the one hand the pressure P in the chamber 26, that is to say in the braking receiver 14, and on the other hand the voltage T at the terminals of the coil 53 of the electro-magnetic control device 50.

The instant origin $t_0$ corresponds on this diagram to the beginning of the intervention of the electromagnetic control device 50.

The pressure P in the chamber 26 has a valve which is maintained up to a time $t_1$ marking the liberation of the passage 64 by the needle-valve 63 under the action of the armature 51 (see FIG. 3).

The pressure P than falls abruptly up to the instant $t_2$ which marks the contact of the piston 45 with the rod 62 of the piston 60 (see FIG. 5).

The fall in pressure then continues, but at a very much slower rate, up to the instant $t_3$ which marks the cessation of the action of the armature 51 (see FIG. 7).

As described above, there is then a controlled rise in pressure along a slope I which is all the greater if the intervention of the magnetic control device has been short.

In fact, the shorter this intervention is, the less liquid is transferred from the intermediate chamber 70 to the accumulation chamber 73; the spring 80 is compressed to a lesser degree and the opening of the regulating valve 29 is greater.

There has been shown in full lines in FIG. 8 a short intervention of the electro-magnetic control device 50 and in broken lines a prolonged intervention of this device.

Conjointly with the procedure described above, the pump 20 ensures the return of the fluid from the chamber 73 towards the master-cylinder 11.

It will be understood that if, during the course of the rise in pressure, the conditions again become such that they correspond to locking of the wheel, a similar procedure to that described above is again initiated.

In accordance with the alternative form of construction illustrated by FIG. 9, the isolating valve 41 is a disc and the recess 38 in which it is housed is surrounded by a perforated cage 90 engaged on the guiding tail 32 and held on this latter by a circlip 91.

This perforated cage 90 ensures a correct holding and appropriate guiding of the valve 41.

According to this same alternative form, the joint 34 associated with the guiding tail 32 is arranged in a groove 93 formed in this tail.

According to the alternative form of construction shown in FIG. 10, the isolating valve 41 carries the guiding tail 32 and is fitted into a bore 100 of the regulating valve; it carries radially a washer 101 for cooperation with an annular shoulder 102 of the regulating valve.

As previously, the guiding tail 32 is engaged in a fluid-tight manner in a bore 33 connected by a conduit 44 to the chamber 26.

There will also be appreciated the self-centering capacity by swivel-jointing of the valve assembly formed conjointly by the regulating valve 29 and the isolating valve 41, this swivel-jointing being effected around the joint 34, taking account of the capacity for deformation of the flexible diaphragm 30 coupled to the regulating valve 29.

Finally, it will be appreciated that in all cases this valve assembly or unit is movable in the chamber 24 connected to the master cylinder.

It will of course be understood that the present invention is not restricted to the forms of embodiment described and illustrated, but includes any alternative form of construction and/or of combination of their various parts.

What we claim is:

1. A modulation device for interposition between hydraulic control means and hydraulic operating means in a brake circuit, comprising a first chamber communicating with the hydraulic control means, and second chamber communicating with the hydraulic operating means, first and second passage for bringing said first and second chambers into communication with each other, a normally closed regulating valve member disposed in said first passage, a normally open isolating valve member disposed in said second passage, said second passage being disposed axially within said regulating valve member, a first piston including a first face communicating with said second chamber and a second face and at least a calibrated orifice extending between said first and second faces, a second piston axially opposite to said first face of first piston, pin means extending axially between said second and first pistons and projecting from said first face of first piston toward said isolating valve member, resilient means urging said pin means toward said isolating valve member, and electromagnetic means controlling an armature that engages said second piston for movement therewith in response to energization of the electromagnetic means thereby displacing said second piston toward said first piston and bringing said first piston into abutment with said second face of the first piston through said pin means.

2. A modulation device according to claim 1, wherein said regulating valve member and said isolating valve member form together a valve unit and wherein said valve unit is movably mounted in said first chamber.

3. A modulation device according to claim 2, further comprising a bore connected to said second chamber, a guiding member in fluidtight engagement with the side wall of the bore and mounted for sliding movement therein, said guiding member being rigidly fixed to said valve unit.

4. A modulation device according to claim 3 wherein the said guiding member is rigidly fixed to said regulating valve member.

5. A modulation device according to claim 3 wherein the said guiding member is rigidly fixed to said isolating member.

6. A modulation device according to claim 5 wherein said regulating valve member has a bore, said isolating valve member being fitted into the last-mentioned bore.

7. A modulation device according to claim 6, there being an annular shoulder on said regulating valve, and wherein a flat annular member is carried radially by said isolating valve, said flat annular member contacting said annular shoulder.

8. A modulation device according to claim 1, further comprising a flexible diaphragm carrying said regulation valve member, said flexible diaphragm dividing said first chamber into two parts, and at least a calibrated orifice disposed between said two parts.

9. A modulation device according to claim 1, further comprising a needle valve member mounted for movement with said second piston, said needle valve member normally preventing communication between a discharge passage and a third chamber, said third chamber being in communication with said second chamber through said orifice of said first piston.

10. A modulation device according to claim 9, wherein said discharge passage communicates with an accumulation chamber, and a piston is mounted for displacement in said accumulation chamber, said last-mentioned piston acting on a valve unit formed by said regulating valve member and said isolating valve member through resilient means.

11. A modulation device according to claim 9, further comprising a bore connected to said second chamber, a guiding member in fluidtight engagement with the side wall of the bore and mounted for sliding movement therein, said guiding member being rigidly fixed to said valve unit, a portion of said lastmentioned piston being disposed in said bore, and said resilient means being disposed between said portion of said lastmentioned piston and said guiding member inside said bore.

12. A modulation device according to claim 1 wherein said pin means comprises a first pin carried by said first piston and extending toward said isolating valve member and a second pin carried by said second piston and extending toward said first piston.

13. A modulation device according to claim 12 wherein said resilient means urging said pin means toward said isolating valve member comprises spring means disposed between said first and second pistons.

* * * * *